United States Patent [19]

Williams

[11] Patent Number: 5,394,746

[45] Date of Patent: Mar. 7, 1995

[54] HOT WIRE FLOW RATE MEASURING CIRCUIT

[75] Inventor: David G. Williams, Birmingham, England

[73] Assignee: Lucas Industries Public Limited Company, Solihull, England

[21] Appl. No.: 974,213

[22] Filed: Nov. 10, 1992

[30] Foreign Application Priority Data

Nov. 11, 1991 [GB] United Kingdom ............... 9123893

[51] Int. Cl.⁶ .................................................. G01F 1/68
[52] U.S. Cl. ................................................ 73/204.15
[58] Field of Search ............ 73/204.15, 204.18, 204.19

[56] References Cited

U.S. PATENT DOCUMENTS

| | | | |
|---|---|---|---|
| 4,196,622 | 4/1980 | Peter | 73/204.18 |
| 4,400,974 | 8/1983 | Nishimura et al. | 73/204.15 |
| 4,450,719 | 5/1984 | Nishimura et al. | 73/204.15 |
| 5,181,420 | 1/1993 | Suzuki et al. | 73/204.15 |

*Primary Examiner*—Richard E. Chilcot, Jr.
*Assistant Examiner*—Harshad Patel
*Attorney, Agent, or Firm*—Staas & Halsey

[57] ABSTRACT

A hot wire flow rate measuring apparatus, having a platinum wire sensor and a thermistor in the upper limbs of a bridge circuit whose lower limbs have resistors. The thermistor, together with a linearising resistor and a scaling resistor, is connected into the bridge circuit via a potential divider. A differential amplifier and a transistor control the supply of power to the bridge circuit so that the platinum wire sensor is maintained at a higher temperature than the thermistor by a fixed temperature difference.

10 Claims, 2 Drawing Sheets

HOT WIRE FLOW RATE MEASURING CIRCUIT

The present invention relates to a hot wire flow rate measuring circuit, for instance for use in determining the rate or mass of air flow for an internal combustion engine management system.

In modern internal combustion engines, electronic fuel injection systems and engine management systems control electronically the supply of fuel and the ignition timing. In order to control these engine parameters, such systems must receive information on the mass air flow, for instance controlled by a throttle valve, in an engine induction system. In particular, the quantity of induced air must be known in order to determine the amount of fuel which has to be injected.

GB 1360421 discloses a hot wire air flow rate meter which can be used to determine the quantity of air in order to control fuel injection. A platinum wire temperature sensor is provided in the form of a straight platinum wire. A further temperature sensor in the form of a metal film resistor has a different resistance from that of the platinum wire sensor. The sensors are mounted in the induction manifold of an internal combustion engine and the platinum wire sensor is heated to a predetermined temperature whereas the other sensor provides a measure of the air temperature within the manifold. The sensors are arranged in a bridge circuit with the power supply to the bridge circuit being controlled so as to maintain the hot wire at the predetermined temperature. The amount of power supplied to the bridge circuit represents the rate of air flow within the manifold.

Although the two sensors can be located in a main bore of an induction manifold, it is preferable to locate the sensors in a by-pass for improved performance. However, the platinum wire sensor is too large to be accommodated in such a by-pass.

GB 2034482 discloses a similar type of hot wire air flow meter in which two identical wound platinum wire sensors are used. Again, the power supply to a circuit containing the sensors is controlled to maintain the hot wire at a constant temperature interval above the ambient air temperature. An output voltage representing the rate of air flow is formed across a temperature-independent resistor connected in series with the hot wire sensor between power supply nodes of the circuit. A relatively complicated circuit arrangement using several operational amplifiers is required in order to provide a linear output representing the rate of air flow.

Although the two sensors of this arrangement are sufficiently compact to be located in a by-pass, two expensive matched sensors are required together with a relatively complex circuit.

According to the invention, there is provided a hot wire flow rate measuring apparatus, comprising: first and second temperature dependent resistances arranged to be located in a gas flow whose flow rate is to be measured, the first temperature dependent resistance being connected between first and second circuit nodes and the second temperature dependent resistance being connected between third and fourth circuit nodes; a first resistor connected between the second circuit node and a fifth circuit node for producing an output signal of the apparatus thereacross; a second resistor connected between the third and fifth circuit nodes; a potential divider having an output terminal connected to the fourth circuit node, a first input terminal connected to the first circuit node, and a second input terminal; and power supply control means arranged to control the supply of power to the first and fifth circuit nodes so as to maintain a predetermined potential difference between the second and third circuit nodes.

The second input terminal of the potential divider may be connected to the second circuit node. As an alternative, the second input terminal of the potential divider may be connected to the fifth circuit node.

Preferably, the first temperature dependent resistance is a metal wire sensor, such as a platinum wire sensor. Preferably the second temperature dependent resistance is a temperature sensitive silicon device, preferably a thermistor. A third resistor may be connected in parallel with the thermistor so as to form a parallel circuit. The parallel circuit may be connected in series with a fourth resistor between the third and fourth circuit nodes.

Preferably the predetermined potential difference is substantially equal to zero. The power supply control means may comprise a differential amplifier having a first differential input connected to the second circuit node, a second differential input, complementary to the first, connected to the third circuit node, and an output for controlling the supply of power to the first and fifth circuit nodes. The output of the differential amplifier may be connected to a control electrode of a transistor whose other electrodes are connected in series with the first and fifth circuit nodes. The transistor may, for instance, be a bipolar transistor of the Darlington type.

The first and second temperature dependent resistances may be located in an air by-pass of an internal combustion engine induction system. The circuit may be connected to or formed as part of a fuel injection system, for instance within an engine management system of an internal combustion engine.

It is thus possible to provide a flow rate measuring apparatus which requires only one metal wire sensor, such as a wound platinum wire sensor. The second sensor can be provided by a cheap and compact thermistor, so that both sensors may readily be accommodated in a by-pass of an internal combustion engine induction system. The circuit is relatively simple and requires relatively few components, particularly relatively few operational amplifiers. The cost and complexity of manufacture may therefore be reduced and reliability and service life increased.

The invention will be further described, by way of example, with reference to the accompanying drawings, in which.

Figure 1:
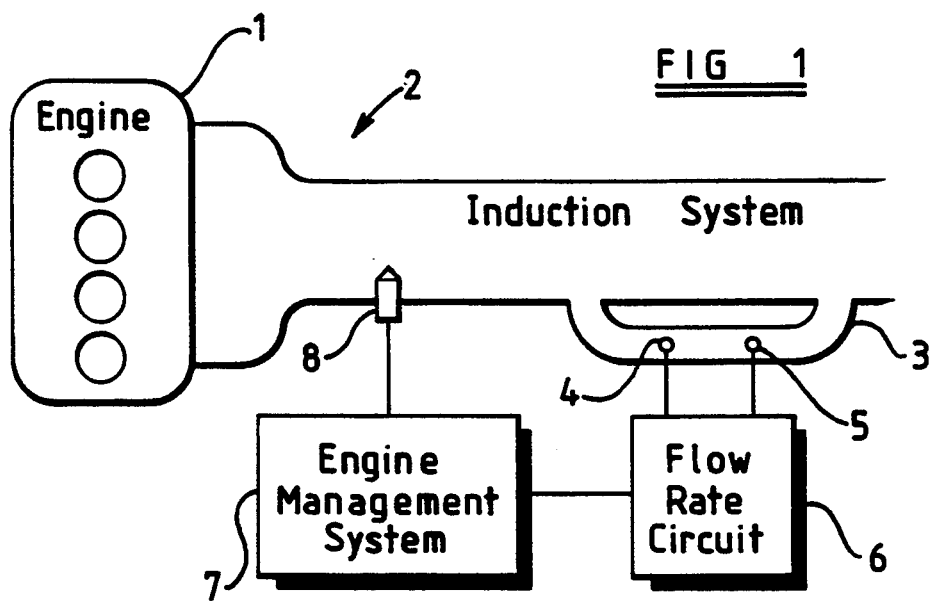
FIG. 1 is a block schematic diagram of an internal combustion engine including a flow rate measuring circuit constituting an embodiment of the invention.

An internal combustion engine 1, for insurance of the automotive type, is provided with an induction system 2 by means of which air and fuel are mixed and supplied into the cylinders of the engine 1. The output demand of the engine is controlled by controlling the rate of air flow through the induction system 2, for instance by means of a throttle (not shown). The induction system has a by-pass 3 which by-passes part of the main bore of the system and contains temperature dependent sensors 4 and 5. The sensors 4 and 5 are connected to inputs of a flow rate measuring circuit 6, whose output is connected to an engine management system 7. The engine management system 7 controls the injection of fuel by means of one or more fuel injectors 8.

Figure 2:
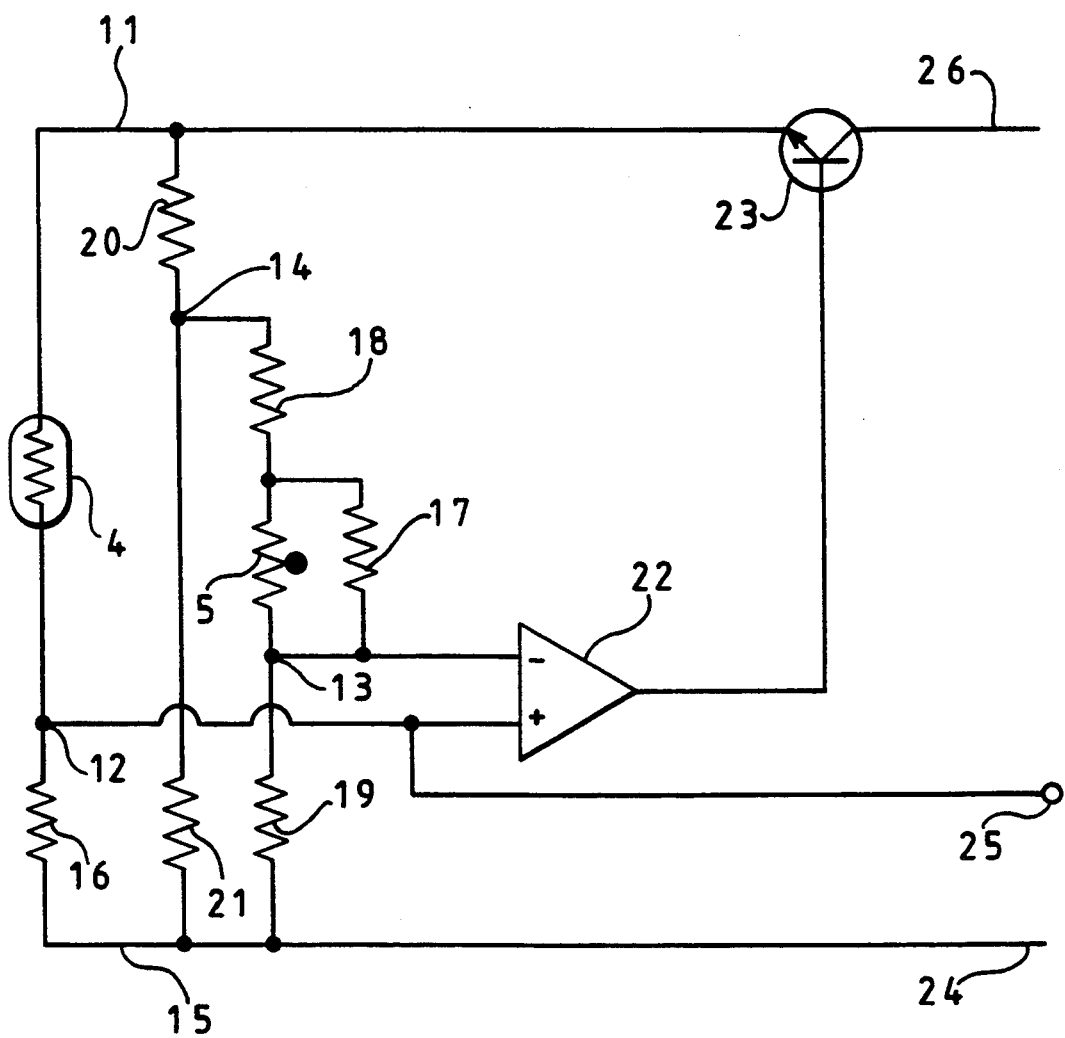
FIG. 2 is detailed circuit diagram of a flow rate measuring circuit of the type shown in FIG. 1.

The flow rate circuit 6 is shown in more detail in FIG. 2. The air flow sensor 4 comprises a wound platinum wire connected between first and second circuit nodes 11 and 12. The temperature sensor 5 comprises a thermistor which, together with resistors 17 and 18, is connected between the circuit nodes 13 and 14. A resistor 16 is connected between the circuit node 12 and a circuit node 15 and provides an output voltage of the circuit representing air flow rate.

A resistor 19 is connected between the circuit nodes 13 and 15. A potential divider comprising series-connected resistors 20 and 21 is connected between the circuit nodes 11 and 15 with its output connected to the circuit node 14.

An operational amplifier 22 has an inverting input connected to the circuit node 13 and a non-inverting input connected to the circuit node 12. The output of the amplifier 22 is connected to the base of a Darlington transistor 23, whose emitter is connected to the circuit node 11.

A common line 24 is connected to the circuit node 15 and provides a common output and power supply connection. An output terminal 25 of the circuit is connected to the circuit node 12. A power supply input line 26 is connected to the collector of the Darlington transistor 23 and receives power from a power source (not shown), for instance derived from a vehicle battery.

In use, the differential amplifier 22 causes the Darlington transistor 23 to pass supply current to the circuit formed by the sensors 4 and 5 and the resistors 16 to 21 so that the potential difference between the circuit nodes 12 and 13 is substantially equal to zero. The current passing through the platinum wire sensor 4 causes the sensor to be heated so that its resistance changes. The platinum wire is held at a constant temperature interval above the ambient air temperature, irrespective of air flow, by adjusting the current such that the potential difference between the circuit nodes 12 and 13 remains at substantially zero.

The current through the thermistor 5 is insufficient to cause any substantial heating of the thermistor, so that the resistance of the thermistor is determined by the temperature of air flowing through the by-pass 3. The platinum wire sensor 4 has a resistance which varies linearly with temperature whereas the resistance of the thermistor 5 varies non-linearly. The parallel resistor 17 is provided so as to linearise the resistance of the thermistor 5 with respect to temperature, and the resistor 18 permits scaling of the linear relationship between resistance and temperature so as to match the characteristic of the platinum wire sensor 4. The potential divider formed by the resistors 20 and 21 reduces the voltage across the thermistor 5, thus reducing the current through it and hence the heating effect of the thermistor.

Figure 3:
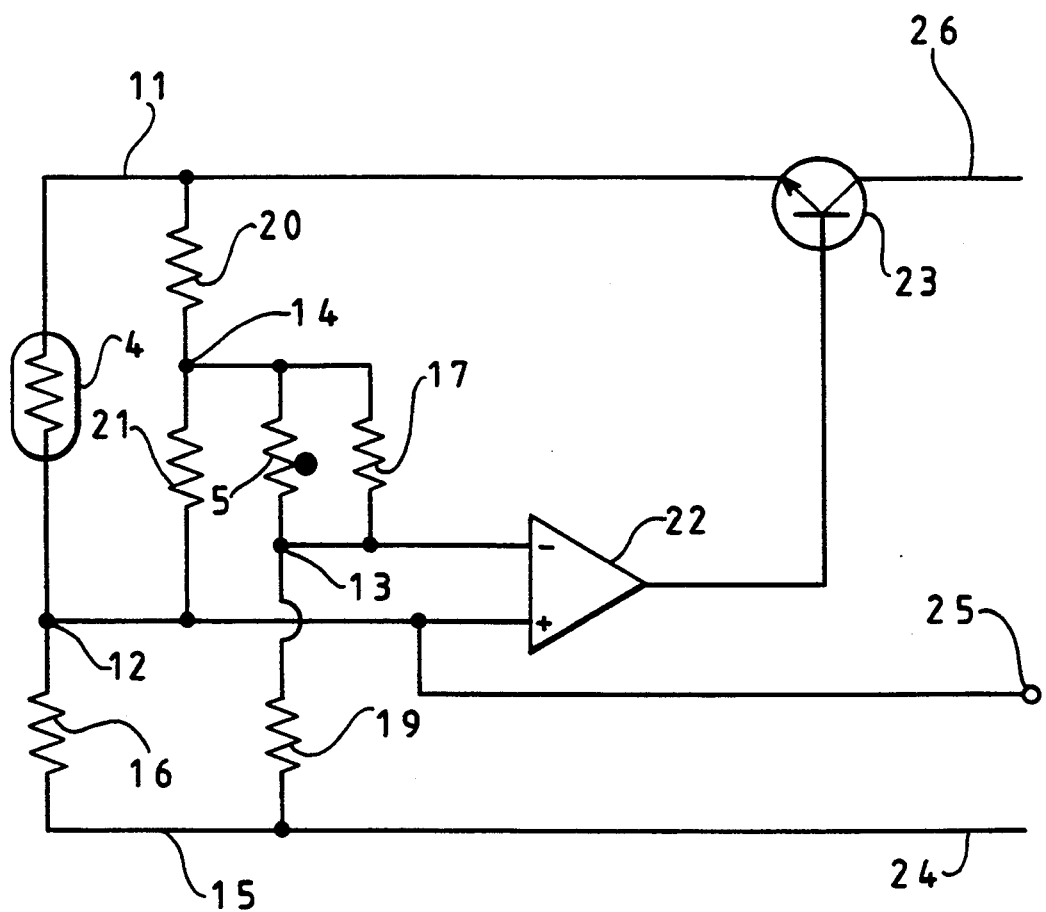
FIG. 3 is a circuit diagram of another flow rate measuring circuit of the type shown in FIG. 1.

The circuit shown in FIG. 3 represents a modification of that shown in FIG. 2. The same reference numerals refer to corresponding parts which will not be further described.

The circuit of FIG. 3 differs from that of FIG. 2 in that the resistor 18 is eliminated and the potential divider formed by the resistors 20 and 21 is connected between the circuit nodes 11 and 12. The values of the resistors 20 and 21 is such that the parallel combination of their resistances is substantially equal to the value of the resistor 18 in FIG. 2.

In one particular example of the circuit of FIG. 3, the platinum wire sensor 4 had a linear temperature coefficient of 3850 ppm/° C., the thermistor 5 had a resistance of 1 Kilohm at 25° C. and a non-linear temperature coefficient of approximately 8200 ppm/° C., the resistor 16 had a value of 9 ohms, and the resistors 17, 19, 20 and 21 had values of 2.5, 1.5, 2.5, and 1.5 Kilohms, respectively.

The circuit of FIG. 3 represents an improvement of the circuit of FIG. 2 in that the current through the circuit is reduced, thus reducing heat dissipation in the circuit. Otherwise, the operation of the circuit of FIG. 3 is substantially the same as that of FIG. 2.

It is thus possible to provide a flow rate measuring circuit which provides an accurate representation of air flow rate which is substantially independent of air temperature. Compared with known arrangements, one of the sensors is replaced by a relatively cheap thermistor. The number of components is relatively small and, in particular, the number of operational amplifiers is reduced as compared with some known arrangements. Both sensors can be located in a by-pass within an induction system of an internal combustion engine, thus allowing improved performance to be achieved.

Although the air flow measuring circuit has been described in its application as part of a control system for an internal combustion engine, the circuit may be used in other applications for measuring air flow. Further, the circuit may measure the flow of gases other than air.

I claim:

1. A hot wire flow rate measuring apparatus, comprising: first to fifth circuit nodes; a temperature dependent resistance and a temperature sensitive silicon device having a temperature dependent resistance for location in a gas flow whose flow rate is to be measured, said temperature dependent resistance being connected between said first circuit node and said second circuit node, and said temperature sensitive silicon device being connected between said third circuit node and said fourth circuit node; a first resistor connected between said second circuit node and said fifth circuit node for producing an output signal of said apparatus thereacross; a second resistor connected between said third circuit node and said fifth circuit node; a third resistor connected in parallel with said temperature sensitive silicon device so as to linearise the resistance of said temperature sensitive silicon device with respect to temperature; a voltage divider having an output terminal connected to said fourth circuit node, a first input terminal connected to said first circuit node, and a second input terminal connected to said second circuit node; and power supply control means connected between said second and third circuit node for controlling a supply of power to said first circuit node and said fifth circuit node so as to maintain a predetermined potential difference between said second circuit node and said third circuit node.

2. An apparatus as claimed in claim 1, in which said first temperature dependent resistance is a metal wire sensor.

3. An apparatus as claimed in claim 2, in which said metal wire sensor is a platinum wire sensor.

4. An apparatus as claimed in claim 1, in which said power supply control means comprises a differential amplifier having an output and first and second differential inputs, said first differential input being connected to said second circuit node and said second differential input being connected to said third circuit node.

5. An apparatus as claimed in claim 4, in which said power supply control means further comprises a transistor having a first control electrode connected to said output of said differential amplifier and second and third electrodes connected in series with said first circuit node and said fifth circuit node.

6. A hot wire flow rate measuring apparatus, comprising: first to fifth circuit nodes; a temperature dependent resistance and a temperature sensitive silicon device having a temperature dependent resistance for location in a gas flow whose flow rate is to be measured, said temperature dependent resistance being connected between said first circuit node and said second circuit node, and said temperature sensitive silicon device being connected in series with a fourth resistor between said third circuit node and said fourth circuit node and in parallel with a third resistor so as to linearise the resistance of said temperature sensitive silicon device with respect to temperature, said fourth resistor being connected to said fourth circuit node; a first resistor connected between said second circuit node and said fifth circuit node for producing an output signal of said apparatus thereacross; a second resistor connected between said third circuit node and said fifth circuit node; a voltage divider having an output terminal connected to said fourth circuit node, a first input terminal connected to said first circuit node, and a second input terminal connected to said fifth circuit node; and power supply control means connected between said second and third circuit node for controlling a supply of power to said first circuit node and said fifth circuit node so as to maintain a predetermined potential difference between said second circuit node and said third circuit node.

7. An apparatus as claimed in claim 6, in which said first temperature dependent resistance is a metal wire sensor.

8. An apparatus as claimed in claim 7, in which said metal wire sensor is a platinum wire sensor.

9. An apparatus as claimed in claim 6, in which said power supply control means comprises a differential amplifier having an output and first and second differential inputs, said first differential input being connected to said second circuit node and said second differential input being connected to said third circuit node.

10. An apparatus as claimed in claim 9, in which said power supply control means further comprises a transistor having a first control electrode connected to said output of said differential amplifier and second and third electrodes connected in series with said first circuit node and said fifth circuit node.

* * * * *